United States Patent
Ruvio et al.

(10) Patent No.: US 10,516,681 B2
(45) Date of Patent: Dec. 24, 2019

(54) VEHICLE CORRELATION SYSTEM FOR CYBER ATTACKS DETECTION AND METHOD THEREOF

(71) Applicant: Tower-Sec Ltd., Kfar-Saba (IL)

(72) Inventors: Guy Ruvio, ElAd (IL); Saar Dickman, Zur-Moshe (IL); Yuval Weisglass, Kfar-Saba (IL); Yoav Etgar, Modiin (IL)

(73) Assignee: Tower-Sec Ltd., Kfar-Saba (IL)

( * ) Notice: Subject to any disclaimer, the term of this patent is extended or adjusted under 35 U.S.C. 154(b) by 134 days.

(21) Appl. No.: 15/469,300

(22) PCT Filed: Sep. 21, 2015

(86) PCT No.: PCT/IL2015/050957
§ 371 (c)(1),
(2) Date: Mar. 24, 2017

(87) PCT Pub. No.: WO2016/046819
PCT Pub. Date: Mar. 31, 2016

(65) Prior Publication Data
US 2017/0230385 A1 Aug. 10, 2017

Related U.S. Application Data

(60) Provisional application No. 62/071,479, filed on Sep. 25, 2014.

(51) Int. Cl.
*H04L 29/06* (2006.01)
*B60R 25/30* (2013.01)
(Continued)

(52) U.S. Cl.
CPC .......... *H04L 63/1416* (2013.01); *B60R 25/30* (2013.01); *G06F 21/552* (2013.01);
(Continued)

(58) Field of Classification Search
None
See application file for complete search history.

(56) References Cited

U.S. PATENT DOCUMENTS 8,705,527 B1 * 4/2014 Addepalli ............. H04W 4/046
370/389
8,781,798 B2 7/2014 Nambiar
(Continued)

FOREIGN PATENT DOCUMENTS

CN 103036874 A 4/2013
WO 2014061021 A1 4/2014

OTHER PUBLICATIONS

Supplementary European Search Report and the European Search Opinion dated Mar. 26, 2018 From the European Patent Office Re. Application No. 15843715.2. (10 Pages).
(Continued)

*Primary Examiner* — Jason Chiang
(74) *Attorney, Agent, or Firm* — Gordon & Rees LLP

(57) ABSTRACT

A system and method for detection of at least one cyber-attack on one or more vehicles including steps of transmitting and/or receiving by a first on-board agent module installed within one or more vehicles and/or a second on-board agent module installed within road infrastructure and in a range of communication with said first on-board agent module metadata to and/or from an on-site and/or remote cloud-based detection server including a correlation engine; detecting cyberattacks based on correlation calculation between the metadata received from one or more first agent module installed within vehicles and/or from one or more second agent modules installed within road infrastructure; indicating a probability of a cyber-attack against one or more vehicle based on correlation calculation; initiating
(Continued)

blocking of vehicle-to-vehicle communication to present and/or stop a spread of an identified threat.

23 Claims, 2 Drawing Sheets

(51) Int. Cl.
  *H04L 29/08* (2006.01)
  *G06F 21/55* (2013.01)
  *H04W 12/12* (2009.01)
  *H04W 4/44* (2018.01)
  *H04W 84/18* (2009.01)

(52) U.S. Cl.
  CPC ........ *G06F 21/554* (2013.01); *H04L 63/1441* (2013.01); *H04L 67/12* (2013.01); *H04W 4/44* (2018.02); *H04W 12/12* (2013.01); *G06F 2221/2113* (2013.01); *H04W 84/18* (2013.01)

(56) References Cited

U.S. PATENT DOCUMENTS

| | | | | |
|---|---|---|---|---|
| 2003/0158657 A1* | 8/2003 | Agnew | ......... | G01C 21/34 701/532 |
| 2003/0182054 A1* | 9/2003 | Peterson | ......... | G01C 21/26 701/409 |
| 2003/0236652 A1 | 12/2003 | Scherrer | | |
| 2005/0254654 A1* | 11/2005 | Rockwell | ......... | H04L 63/1416 380/270 |
| 2009/0326791 A1* | 12/2009 | Horvitz | ......... | G01C 21/3461 701/119 |
| 2010/0296387 A1* | 11/2010 | Jain | ......... | G06F 21/606 370/216 |
| 2011/0083011 A1* | 4/2011 | DiCrescenzo | ......... | H04L 9/006 713/158 |
| 2011/0210973 A1* | 9/2011 | Di Crescenzo | ......... | H04L 41/142 345/440 |
| 2011/0213968 A1* | 9/2011 | Zhang | ......... | H04L 63/20 713/158 |
| 2011/0258435 A1* | 10/2011 | Bellur | ......... | H04L 9/3273 713/158 |
| 2012/0254960 A1 | 10/2012 | Lortz | | |
| 2012/0284790 A1 | 11/2012 | Bhargava | | |
| 2013/0141247 A1 | 6/2013 | Ricci | | |
| 2013/0158821 A1 | 6/2013 | Ricci | | |
| 2013/0227648 A1 | 8/2013 | Ricci | | |
| 2014/0012435 A1* | 1/2014 | Sugihara | ......... | B60W 50/0098 701/2 |
| 2014/0031005 A1* | 1/2014 | Sumcad | ......... | H04W 4/046 455/405 |
| 2014/0040434 A1* | 2/2014 | Rybak | ......... | G07C 5/008 709/219 |

OTHER PUBLICATIONS

CAR 2 CAR Communication Consortium "CAR 2 CAR Communication Consortium Manifesto: Overview of the C2C-CC System", CAR 2 CAR Communication Consortium, XP002556812, Retrieved From the Internet, Version 1.1, p. 1-94, Aug. 28, 2007. Chap.4 'System Architecture', Figs.3, 4.

Rahbari, Mina; et al., "Efficient detection of sybil attack based on cryptography in vanet" arXiv preprint arXiv: 1112.2257, 2011. Nov. 30, 2011 (Nov. 30, 2011) abstract, the whole doc.

Ohen, Chen, et al. A robust detection of the sybil attack in urban vanets. In: Distributed Computing Systems Workshops, 2009. ICDCS Workshops '09. 29th IEEE International Conference on. IEEE, 2009. p. 270-276. Dec. 31, 2009 (Dec. 31, 2009) abstract, the whole doc.

International Preliminary Report on Patentablility dated Feb. 21, 2017 From the International Preliminary Examining Authority Re. Application No. PCT/IL2015/050957. (15 Pages).

Communication Pursuant to Article 94(3) EPC dated Feb. 14, 2019 From the European Patent Office Re. Application No. 15843715.2. (8 Pages).

\* cited by examiner

VEHICLE CORRELATION SYSTEM FOR CYBER ATTACKS DETECTION AND METHOD THEREOF

CROSS-REFERENCE TO RELATED APPLICATIONS

This application claims priority to and is the National Stage filing of International Application No. PCT/IL2015/050957, titled VEHICLE CORRELATION SYSTEM FOR CYBER ATTACKS DETECTION AND METHOD THEREOF filed on Sep. 21, 2015, which claims the benefit of U.S. Provisional Application No. 62/071,479, filed on Sep. 25, 2014, the content of which is expressly incorporated by reference in its entirety.

FIELD OF THE INVENTION

The present invention relates generally to vehicle network system monitoring and a vehicle data integrity monitoring method that uses the network system.

BACKGROUND OF THE INVENTION

Connected vehicles hold tremendous potential for improving road safety while simultaneously reducing energy consumption and road congestion through data sharing over the next decade. In general terms, a connected car is a road vehicle equipped with three sets of communications systems: Internet access, an internal network, which enables the car to route its connection access (sometimes known as vehicle-to-internet, or V2I) to other devices that are installed inside—and possibly outside—of the vehicle. Alongside these typically there is the CAN bus (or similar) used to interconnect the gamut of ECUs, sensors and actuators that now form part of a vehicle's inner electronic workings. Increasingly, such cars are fitted with specific technologies that link into the Internet access or internal network to provide additional driver benefits: automatic notification of collisions, notification of excessive speeding, and other safety alerts, for example. There are three additional communications types that supplement these: a vehicle-to-vehicle (V2V) technology that enables cars to communicate wirelessly and even maintain temporary networks between vehicles that can inform accident prevention, road hazards, and other driving intelligence; a vehicle-to-passenger that enables cars to communicate with the passengers present in the vehicle; and Internet of Things (Vehicle-to-IoT or V2IoT), as a connected entity receiving data from external sources, and sharing data that it captures with remote third-parties for specific applications (traffic flow updates, for example). However, connected vehicles represent a security concern, due to the multiple potential attack vectors exploiting the communication to the vehicle and from it. The concern is growing rapidly as vehicles are becoming increasingly more connected whether to devices and the Internet of Things or to other connected vehicles. It further intensifies with the continuing development of autonomous vehicles.

One of the main concerns is the real time identification of the origin of a threat in the area of the attack. If one vehicle is attacked, and is in communication with additional vehicles in the area, it is possible to establish a network where metadata associated with the attack is collected in the detecting area. After the information is collected, it is then can be dispersed to other vehicles while establishing a certain pattern of the attack and ways to prevent it from affecting other vehicles.

An article 'Experimental Security Analysis of a Modern Automobile' (2010) experimentally demonstrated that an informed attacker who is able to infiltrate ECUs can circumvent a broad array of safety critical systems. 'Comprehensive Experimental Analyses of Automotive Attack Surfaces' (2011) proposed that remote exploitation of connected vehicles is feasible via a broad range of 'attack vectors' (including mechanics tools, compact disc players, Bluetooth links, and cellular radio); and further, that wireless communications channels can allow remote vehicle control, location tracking, in-cabin audio 'exfiltratrion', and vehicle theft. The foreseeable exploits of the vehicle data integrity might lead to data theft, such as: online automotive apps and services that contain banking/credit records; congestion charge or toll payment information; general personal identification data; insurance and tax data—useful for identity theft; license plates and other vehicle registration data; vehicle location information; vehicle physical security data; extortion/denial-of-service threat; fraud and deception (altering or deleting schedule logs and records); freight and goods theft (activating false alarms that cause goods to be left unattended); immobilization; premises security and burglary—vehicle data that reveals businesses and homes are unoccupied and many others.

U.S. Patent Application 20120254960, Connecting mobile devices, internet-connected vehicles, and cloud services, discloses a three-way trust relationship that is established between a mobile device, Internet-connected vehicle system, and a cloud-based service. Access rights are granted to the mobile device from the vehicle system, such that the mobile device can securely connect to, and obtain status information and/or control the Internet-connected vehicle system, through the cloud-based service.

U.S. Patent Application 20120284790, Providing cyber protection for the electric grid, discloses a method of improving security in an electrical grid network. The method includes configuring a lifecycle map associated with an operation in the electrical grid network, the lifecycle map including at least a start configuration, a final configuration, and a plurality of valid events arranged to link the start configuration and the final configuration, the start configuration and the final configuration corresponding to particular states of the electrical grid network. The method also includes monitoring at least one of messages and device configurations in the electrical grid network to detect one or more live events associated with the operation and comparing the plurality of live events to the lifecycle map to identify an anomaly in the live events.

U.S. Patent Application 20130227648, On board vehicle network security, discloses a microprocessor executable network controller operable to at least one of (a) isolate at least one other on board computational component in a vehicular wireless network not affected by a security breach event from a computational component affected by the security breach event and (b) isolate an on board computational component in the vehicular wireless network and affected by the security breach event from the at least one other on board computational component not affected by the security breach event.

U.S. Patent Application 20030236652, System and method for anomaly detection, discloses a system and method for detecting one or more anomalies in a plurality of observations. In one illustrative embodiment, the observations are real-time network observations collected from a plurality of network traffic. The method includes selecting a perspective for analysis of the observations. The perspective is configured to distinguish between a local data set and a remote data set. The method applies the perspective to select a plurality of extracted data from the observations. A first mathematical model is generated with the extracted data. The extracted data and the first mathematical model is then used to generate scored data. The scored data is then analyzed to detect anomalies.

U.S. Patent Application 20130141247, Method and system for maintaining and reporting vehicle occupant information, discloses an occupant information module that reports, to a third party, occupant information regarding a vehicle occupant.

U.S. Patent Application 20130158821, Method and system for vehicle data collection, discloses roadway map updating using vehicle performance and location information from plural vehicles.

U.S. Pat. No. 8,781,798, Systems and methods for exploring and utilizing solutions to cyber-physical issues in a sandbox, discloses methods and arrangements for accommodating and synthesizing data for seeking broad-based solutions to complex problems. Logical models with respect to infrastructure in a first location are created. System-level models are created with respect to the logical models, and simulations are performed on the system-level models to verify expected behavior. Feedback is employed from the performed simulations to forecast changes in the system-level models.

The prior art however does not address vehicle correlation system for detection of at least one cyber-attack on one or more vehicles comprising a plurality of on-board communication agent modules communicating with one another.

Therefore, there is a long felt and unmet need for a system and method that overcomes the problems associated with the prior art. The system and method will provide vehicle correlation calculation for detection of cyber-attacks on one or more vehicles communicating with one another via on-board communication agent modules.

SUMMARY

It is hence one object of this invention to disclose a vehicle correlation system for detection of at least one cyber-attack on one or more vehicles comprising a plurality of on-board communication agent modules communicating with one another, said system comprising: a first on-board agent module installed within one or more vehicles; a second on-board agent module installed within road infrastructure and in a range of communication with said first on-board agent module; an on-site and/or remote cloud-based detection server comprising a correlation engine; said first agent module and said second agent module are operable to transmit and/or receive metadata to and/or from said correlation engine; and said correlation engine is configured to detect cyberattacks based on correlation calculation between said metadata received from one or more first agent module installed within vehicles and/or from one or more second agent modules installed within road infrastructure.

It is another object of the current invention to disclose a method for detection of at least one cyber-attack, said method comprising steps of: transmitting and/or receiving by a first on-board agent module installed within one or more vehicles and/or a second on-board agent module installed within road infrastructure and in a range of communication with said first on-board agent module metadata to and/or from an on-site and/or remote cloud-based detection server comprising a correlation engine; detecting cyber-attacks based on correlation calculation between said metadata received from one or more first agent module installed within vehicles and/or from one or more second agent modules installed within road infrastructure.

BRIEF DESCRIPTION OF THE FIGURES

In the following detailed description of the preferred embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention. The present invention may be practiced according to the claims without some or all of these specific details. For the purpose of clarity, technical material that is known in the technical fields related to the invention has not been described in detail so that the present invention is not unnecessarily obscured.

DETAILED DESCRIPTION OF THE INVENTION

Figure 1:
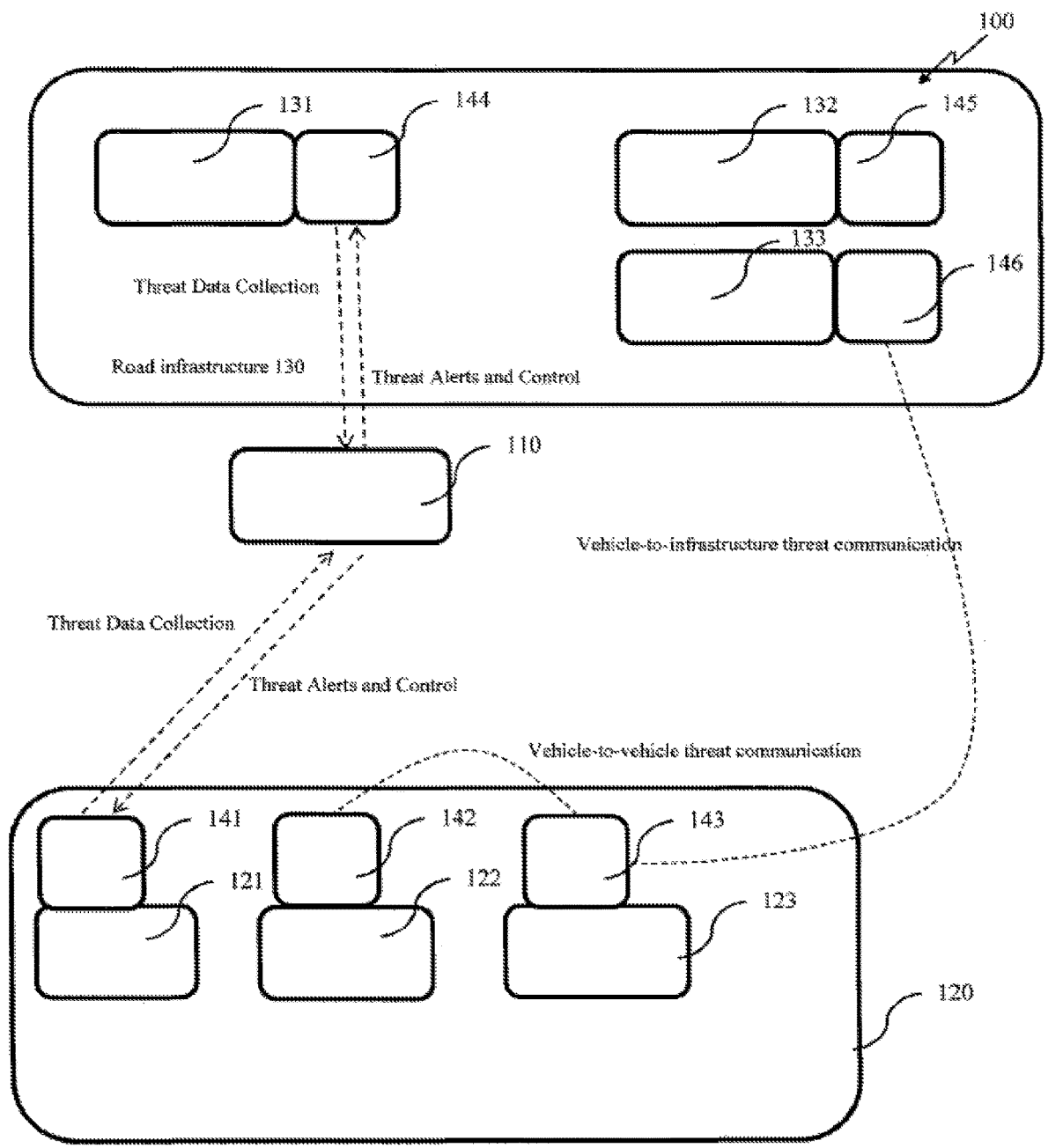
FIG. 1 is an exemplary correlation detection implementation in accordance with the preset invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The present invention may be practiced according to the claims without some or all of these specific details. For the purpose of clarity, technical material that is known in the technical fields related to the invention has not been described in detail so that the present invention is not unnecessarily obscured.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "receiving", "transmitting", "detecting", "configuring", "correlating," "identifying", "classifying", "configuring", "interrogating" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices, including integrated circuits down to and including chip level firmware, assembler, and hardware based micro code.

The term "cloud" refers herein to a server located on the internet or hosted in a dedicated remote location, which provides communication and/or data services to the vehicles and the infrastructure.

The term "infrastructure" refers herein to electronic road infrastructure, including electronic road signs and traffic lights stop lights, railroad crossing, hazard/construction in the roads, highway interchanges. Also referred to as road infrastructure.

The term "geographical information" refers herein to various layers of geographic data, including topographic data and metadata and city information. Sometimes referred in the literature as "geographic information system—GIS".

The term "agent" refers herein to a particle of embedded software in charge of collecting processing and sending data from the vehicles or the infrastructure to the cloud.

The term "metadata" refers herein to information which describes underlying data.

The term "infotainment system" refers herein to a media and entertainment system installed in the vehicle.

Reference is now made to FIG. 1, presenting a diagram illustrating an implementation for vehicle correlation system for detection of at least one cyber-attack on one or more vehicles.

A correlation engine [110] collects data from software agents [141-146] installed on vehicles [121-123] and infrastructure [131-133], analyses correlation between data parameters such as a suspect or an identified threat on one or more vehicle, spread of a suspect or an identified attack among multiple vehicles, location of the vehicles, geographic information, vehicle unique identification, event time, vehicle to vehicle communications characteristics, vehicle to infrastructure communications characteristics, vehicle to cloud communications characteristics, road infrastructure data and software application downloaded and/or used in the vehicle. Based upon the correlation which occurs on the correlation engine, a probability of a cyber-attack is calculated. Upon a suspect cyber threat, the vehicles and road infrastructure which are identified as targets for a cyber-attack—alerts and/or attack prevention measures are sent from the correlation engine to the vehicles and or the road infrastructure.

Figure 2:
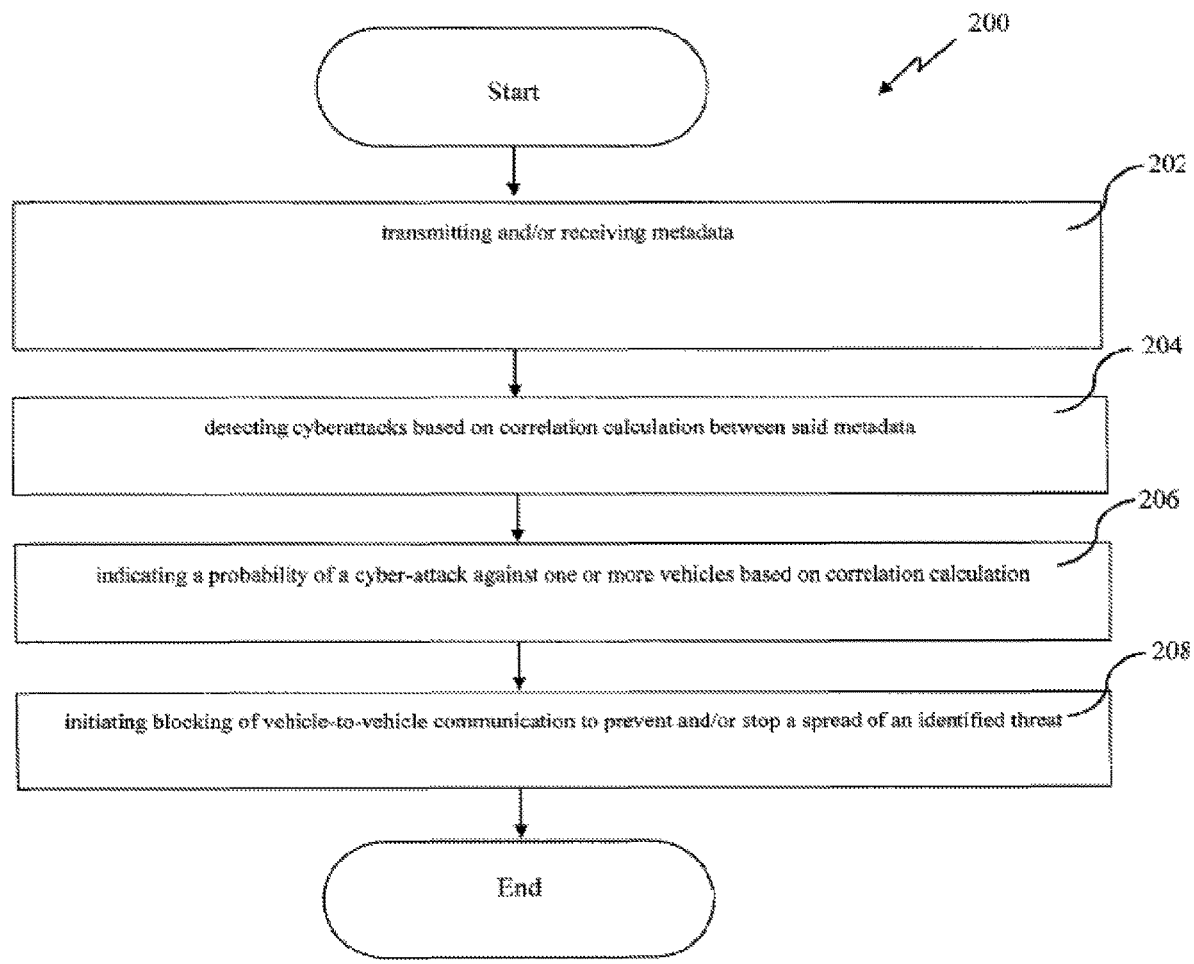
FIG. 2 is an exemplary correlation detection method in accordance with the preset invention.

Reference is now made to FIG. 2, presenting a flow diagram illustrating a method for detection of at least one cyber-attack on one or more vehicles [200]. Said method comprises, for a number of repetitions, steps of providing a wireless communication system [100]. The method comprises steps of transmitting and/or receiving [202] by a first on-board agent module installed within one or more vehicles and/or a second on-board agent module installed within road infrastructure and in a range of communication with said first on-board agent module metadata to and/or from an on-site and/or remote cloud-based detection server comprising a correlation engine; detecting [204] cyberattacks based on correlation calculation between said metadata received from one or more first agent module installed within vehicles and/or from one or more second agent modules installed within road infrastructure; indicating [206] a probability of a cyber-attack against one or more vehicles based on correlation calculation; initiating [208] blocking of vehicle-to-vehicle communication to prevent and/or stop a spread of an identified threat.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A vehicle correlation system for detection of a probability of at least one cyber-attack on one or more vehicles the system comprising:
    a. a plurality of first embedded software modules each installed within one of a plurality of vehicles;
    b. a plurality of second embedded software modules each installed within a road infrastructure, wherein the road infrastructure is vehicle traffic related infrastructure and is selected from a group consisting of traffic light infrastructure, stop light infrastructure, railroad crossing infrastructure, and highway interchange infrastructure;
    c. a detection server communicating with the plurality of first embedded software modules and the plurality of second embedded software modules via a network;
    wherein the plurality of first embedded software modules and the plurality of second embedded software modules are operable to transmit metadata to the detection server;
    wherein the detection server indicates a probability of a cyber-attack against one or more vehicles based on a correlation calculation between the metadata received from one or more of the plurality of first embedded software modules and metadata received from one or more of the plurality of second embedded software modules, wherein the identified probability of a cyber-attack is of a cyber-attack effecting at least one of vehicle functioning, vehicle safety, and integrity of data transmitted from one or more of the plurality of vehicles, and wherein the detection server is configured to initiate blocking vehicle-to-vehicle communication to prevent a further spread of the suspect and/or the identified threat;
    wherein the detection server uses geographic information system (GIS) for calculating the correlation;
    wherein the correlation is indicative of a member selected from a group consisting of: threat to one or more of the plurality of vehicles, an identified attack originated from the plurality of multiple vehicles, wherein the correlation identifies infection and spread of the identified cyber-attack based on vehicle-to-vehicle communication;
    wherein the metadata is associated with at least one of data communicated among the plurality of vehicles and data between one or more of the plurality of vehicles and the infrastructure, the metadata comprises data parameters selected from a group consisting of:

a location of one or more of the plurality of vehicles, geographic information, a vehicle unique identification, an event time, one or more vehicle-to-vehicle communication parameters, one or more vehicle-to-infrastructure communication parameters, one or more vehicle-to-cloud communication parameters, metadata of software applications used in one or more of the plurality of vehicles.

2. The system according to claim 1, wherein the correlation is indicative of a spread of a suspect or an identified attack among multiple embedded software modules from the first and/or second embedded software modules over time and/or location.

3. The system according to claim 1, wherein at least some of the metadata is transmitted to at least one of the plurality of first embedded software modules and/or at least one of the plurality of second embedded software modules.

4. The system according to claim 1, wherein the correlation engine is configured to identify a pattern of an attack spread according to the correlation calculation.

5. The system according to claim 1, wherein one or more of the plurality of first embedded software modules are operable to notify each other based on vehicle-to-vehicle communication of the suspect and/or the identified threat.

6. The system according to claim 1, wherein the detection server identifies a location based on cellular data and the metadata.

7. The system according to claim 1, wherein the detection server uses geographic information for calculating the correlation.

8. The system according to claim 1, wherein the metadata is originated from an infotainment system.

9. The system according to claim 1, wherein at least some of the metadata is originated from sensors of the plurality of vehicles.

10. The system according to claim 1, wherein the metadata is originated from telematics of the plurality of vehicles.

11. The system according to claim 1, wherein the plurality of vehicles travel over air, land or sea.

12. A method for detection of a probability of at least one cyber-attack, the method comprising:
receiving metadata from a plurality of first embedded software modules each installed within one of a plurality of vehicles and metadata from a plurality of second embedded software modules installed within road infrastructure, wherein the road infrastructure is vehicle traffic related infrastructure and is selected from a group consisting of: traffic light infrastructure, stop light infrastructure, railroad crossing infrastructure, and highway interchange infrastructure and in a range of communication with at least one of the first embedded software;
indicating a probability of cyberattacks based on a correlation between the metadata received from one or more of the plurality of first embedded software modules and metadata received from one or more of the plurality of second embedded software modules, wherein the identified probability of a cyber-attack is of a cyber-attack effecting at least one of vehicle functioning, vehicle safety, and integrity of data transmitted from one or more of the plurality of vehicles, and wherein the detection server is configured to initiate blocking vehicle-to-vehicle communication to prevent a further spread of the suspect and/or the identified threat;
wherein geographic information system (GIS) is used for calculating the correlation;
wherein the correlation is indicative of a member selected from a group consisting of: a threat to one or more of the plurality of vehicles, an identified attack originated from the plurality of multiple vehicles, wherein the correlation identifies infection and spread of the identified cyber-attack based on vehicle-to-vehicle communication;
wherein the metadata is associated with at least one of data communicated among the plurality of vehicles and data between one or more of the plurality of vehicles and the infrastructure, the metadata comprises data parameters selected from a group consisting of:
a location of one or more of the plurality of vehicles, geographic information, a vehicle unique identification, an event time, one or more vehicle-to-vehicle communication parameters, one or more vehicle-to-infrastructure communication parameters, one or more vehicle-to-cloud communication parameters, metadata of software applications used in one or more of the plurality of vehicles.

13. The method according to claim 12, wherein the correlation is indicative of a spread of a suspect or an identified attack among multiple embedded software modules from the first and/or second embedded software modules over time and/or location.

14. The method according to claim 13, wherein one or more of the first embedded software modules installed within one or more vehicles are operable to notify each other based on vehicle-to-vehicle communication of the suspect and/or the identified threat.

15. The method according to claim 12, wherein at least some of the metadata is transmitted to at least one of the plurality of first embedded software modules and/or at least one of the plurality of second embedded software modules.

16. The method according to claim 12, wherein a server is configured to identify a pattern of an attack spread according to the correlation.

17. The method according to claim 12, wherein the correlation is based on location calculated from cellular data.

18. The method according to claim 12, wherein the correlation is based on geographic information calculated from a third party geographic information system (GIS).

19. The method according to claim 18, wherein the GIS contains city data.

20. The method according to claim 12, wherein the metadata is originated from an infotainment system.

21. The method according to claim 12, wherein the metadata is originated from the vehicles' sensors.

22. The method according to claim 12, wherein the metadata is originated from the vehicles' telematics systems.

23. The method according to claim 12, wherein the vehicles travel over air, land or sea.

* * * * *